US010070259B1

(12) United States Patent
Ivanov et al.

(10) Patent No.: US 10,070,259 B1
(45) Date of Patent: Sep. 4, 2018

(54) ALTITUDE MAP FOR INDOOR POSITIONING SERVICES

(71) Applicant: HERE Global B.V., Eindhoven (NL)

(72) Inventors: Pavel Ivanov, Tampere (FI); Lauri Aarne Johannes Wirola, Tampere (FI); Jari Tapani Syrjärinne, Tampere (FI); Muhammad Irshan Khan, Tampere (FJ)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/441,365

(22) Filed: Feb. 24, 2017

(51) Int. Cl.
*H04W 4/38* (2018.01)
*H04W 4/02* (2018.01)
(Continued)

(52) U.S. Cl.
CPC ........... *H04W 4/023* (2013.01); *G01S 5/0252* (2013.01); *H04W 4/006* (2013.01); *H04W 4/043* (2013.01); *H04W 4/38* (2018.02)

(58) Field of Classification Search
CPC ..... H04W 4/023; H04W 4/006; H04W 4/043; G01S 5/0252; G01S 5/02; G01C 5/06; G01C 21/00
See application file for complete search history.

(56) References Cited

U.S. PATENT DOCUMENTS

2006/0271297 A1\* 11/2006 Repelli .................... G01W 1/00
702/3
2012/0290253 A1 11/2012 Barrett et al.
(Continued)

FOREIGN PATENT DOCUMENTS

CN 105046316 A 11/2015
JP 2007003195 A 1/2007
(Continued)

OTHER PUBLICATIONS

Tilman Wekel et al. "Mono Vision Based Construction of Elevation Maps in Indoor Environments", 8th WSEAS International Conference on Signal Processing, Computational Geometry and Artificial Vision (ISCGAV'08) Rhodes, Greece, pp. 125-130, Aug. 20-22, 2008.
(Continued)

*Primary Examiner* — Chuong A Ngo
(74) *Attorney, Agent, or Firm* — Lempia Summerfield Katz LLC

(57) ABSTRACT

A method is disclosed comprising: obtaining a plurality of pieces of estimation information, the obtaining comprising receiving or determining the plurality of pieces of estimation information, wherein each of the plurality of pieces of estimation information represents one or more respective absolute values of an altitude, wherein each of the one or more absolute values of an altitude is associated with a respective position information, each of the plurality of pieces of estimation information determined based, at least in part, on a respective relative altitude information and, at least in part, on a respective absolute altitude information associated with a data element of a database comprising map data representing an altitude map; and aggregating the plurality of pieces of estimation information in a spatial grid, wherein the spatial grid is divided into a plurality of grid points. It is further disclosed an according apparatus, computer program and system.

19 Claims, 8 Drawing Sheets

(51) Int. Cl.
    *G01S 5/02* (2010.01)
    *H04W 4/04* (2009.01)
    *H04W 4/00* (2018.01)

(56) References Cited

U.S. PATENT DOCUMENTS

| | | | |
|---|---|---|---|
| 2013/0196685 A1* | 8/2013 | Griff | H04L 43/067 455/456.1 |
| 2014/0114567 A1 | 4/2014 | Buchanan et al. | |
| 2014/0200846 A1 | 7/2014 | Wachter et al. | |
| 2015/0247917 A1* | 9/2015 | Gum | H04W 4/029 342/452 |
| 2016/0033266 A1 | 2/2016 | Le Grand et al. | |
| 2016/0258749 A1 | 9/2016 | MacGougan et al. | |

FOREIGN PATENT DOCUMENTS

| | | |
|---|---|---|
| KR | 20120096819 A | 8/2012 |
| WO | 2012155000 A2 | 11/2012 |
| WO | WO2014109936 A1 | 7/2014 |

OTHER PUBLICATIONS

PCT International Search Report and Written Opinion of the International Searching Authority dated Jun. 6, 2018 for corresponding PCT/EP2018/054020.

* cited by examiner

ALTITUDE MAP FOR INDOOR POSITIONING SERVICES

FIELD

The following disclosure relates to the field of navigation, or more particularly relates to systems, apparatuses, and methods for obtaining information for an altitude map.

BACKGROUND

Indoor positioning (i.e. position finding, including floor detection) requires novel systems and solutions that are specifically developed and deployed for this purpose. The 'traditional' positioning technologies, which are mainly used outdoors, e.g. satellite and cellular positioning technologies, generally cannot deliver such performance indoors that would enable seamless and equal navigation experience in both environments. The required positioning accuracy (e.g. 2-3 m), coverage (e.g. ~100%) and floor detection are challenging to achieve indoors with satisfactory performance levels with the systems and signals that were not designed and specified for the indoor use cases. Satellite-based radio navigation signals simply do not penetrate enough through the walls and roofs for adequate signal reception, and the cellular signals usually have too narrow bandwidth for accurate ranging by default.

Several indoor-dedicated solutions have been developed and commercially deployed during the past years, e.g. solutions based on pseudolites (Global Positioning System (GPS)-like short range beacons), ultra-sound positioning, BTLE signals (e.g. High-Accuracy Indoor Positioning, HAIP) and WiFi-Fingerprinting. What is typical to these solutions is that they require either deployment of totally new infrastructure (beacons, tags to name but a few examples) or manual exhaustive radio surveying of the buildings including all the floors, spaces and rooms. This is rather expensive and will take a considerable amount of time to build the coverage to the commercially expected level, which in some cases narrowed the potential market segment only to very thin customer base, e.g. for health care or dedicated enterprise solutions. Further, the diversity of these technologies makes it difficult to build a globally scalable indoor positioning solution, and the integration and testing will become complex if a large number of technologies needs to be supported in the consumer devices, such as smartphones.

For an indoor positioning solution to be commercially successful, that is, being globally scalable, having low maintenance and deployment costs, and offering acceptable end-user experience, the solution should be based on existing infrastructure in the buildings and on existing capabilities in the consumer devices. This leads to the conclusion that the indoor positioning is advantageously based on WiFi- and/or Bluetooth (BT)-technologies that are already supported in every smartphone, tablet, laptop and even in the majority of the feature phones. It is, thus, required to find a solution that uses the WiFi- and BT-radio signals in such a way that makes it possible to achieve e.g. 2-3 m horizontal positioning accuracy, e.g. close to 100% floor detection with the ability to quickly build the global coverage for this approach.

Floor detection can be based, at least in part, on altitude values, which are known to be estimated by GPS. However, such altitude estimation have very low accuracy (e.g. +−50 m), which is not sufficient for floor detection. Accurate altitude for WiFi-radio map creation, which can be used for indoor positioning respectively navigation may be desirable.

Huge volumes of measurements data could be harvested via crowd-sourcing if the consumer devices were equipped with the necessary functionality to enable the data collection as a background process, naturally with the end-user consent. It could also be possible to use volunteers to survey the buildings in exchange of reward or recognition and get the coverage climbing up globally in the places and venues important for the key customers. However, the technical challenges related to the harvesting, processing, redundancy, ambiguity and storing the crowd-sourced data need to be understood and solved first, before the WiFi-radio map creation can be based on the fully crowd-source data.

SUMMARY

An altitude map may be obtained via crowd-sourcing by using an a-priori known starting floor before harvesting the crows-sourced data. However, in a real life scenario, it is generally not possible to start harvesting data under the condition that the harvesting starts at a certain floor, since the starting floor cannot be accurately determined.

It is thus, inter alia, an object of the disclosure to provide a solution for obtaining an altitude map based on crowd-sourced data.

According to a first exemplary aspect of the present disclosure, a method is disclosed, the method comprising: obtaining a plurality of pieces of estimation information, the obtaining comprising receiving or determining the plurality of pieces of estimation information, wherein each of the plurality of pieces of estimation information represents one or more respective absolute values of an altitude, wherein each of the one or more absolute values of an altitude is associated with a respective position information, each of the plurality of pieces of estimation information determined based, at least in part, on a respective relative altitude information and, at least in part, on a respective absolute altitude information associated with a respective data element of a database comprising map data representing an altitude map; and aggregating the plurality of pieces of estimation information in a spatial grid, wherein the spatial grid is divided into a plurality of grid points.

This method may for instance be performed and/or controlled by an apparatus, for instance a server. Alternatively, this method may be performed and/or controlled by more than one apparatus, for instance a server cloud comprising at least two servers. The method may for instance be performed and/or controlled by using at least one processor of an apparatus.

According to a further exemplary aspect of the disclosure, a computer program is disclosed, the computer program when executed by a processor causing an apparatus, for instance a server, to perform and/or control the actions of the method according to the first exemplary aspect of the disclosure.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the disclosure, an apparatus is disclosed, configured to perform and/or control or comprising respective means for performing and/or controlling the method according to the first exemplary aspect of the disclosure.

The means of the apparatus may be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect of the disclosure, an apparatus is disclosed, comprising at least one processor and at least one memory including computer program code, the at least one memory and the computer program code configured to, with the at least one processor, cause an apparatus, for instance the apparatus, at least to perform and/or to control the method according to the first exemplary aspect of the disclosure.

The above-disclosed apparatus according to any aspect of the disclosure may be a module or a component for a device, for example a chip. Alternatively, the disclosed apparatus according to any aspect of the disclosure may be a device, for instance a server or server cloud. The disclosed apparatus according to any aspect of the disclosure may comprise only the disclosed components, for instance means, processor, memory, or may further comprise one or more additional components.

According to a further exemplary aspect of the disclosure, a system is disclosed, comprising: an apparatus according to any aspect of the disclosure as disclosed above, and one or more electronic devices (e.g. portable electronic devices), wherein the apparatus is configured to obtain a plurality of pieces of estimation information from the one or more electronic devices.

In the following, exemplary features and exemplary embodiments of all aspects of the present disclosure will be described in further detail.

The plurality of pieces of estimation information may for instance stem from one or more electronic devices. An example of such an electronic device is a portable electronic device, such as for instance a mobile terminal (e.g. a mobile phone). Alternatively, at least a part, or even all of the plurality of pieces of estimation information may stem from an entity that is different from the one or more electronic devices (e.g. portable electronic devices, in particular mobile phones), e.g. from a server. The entity may for instance have stored the part of the plurality of pieces of estimation information, e.g. in a database.

In case the obtaining of the plurality of pieces of estimation information comprises determining the plurality of pieces of estimation information, the respective estimation information is determined, e.g. by using a processor. The processor may for instance be part of an apparatus, e.g. the apparatus performing and/or controlling the method according to the first aspect of the present disclosure. In this case, respective relative altitude information and respective absolute altitude information may for instance be received (e.g. from one or more electronic devices) prior to determining the plurality of pieces of estimation information. Based on the received relative altitude information and the received absolute altitude information, the estimation information is determined, e.g. on part of an apparatus (e.g. a server) performing and/or controlling the method according to the first aspect of the disclosure. Some or all of the plurality of pieces of estimation information may for instance be determined by using a Kalman filter.

The Kalman filter may for instance be any kind (e.g. method) of signal processing that utilizes a dynamic model (also referred to as state-transition model) propagated by calculating an innovation, wherein the innovation is the difference between an input information and an information that is estimated, produced by the dynamic model. For instance, the Kalman filter determines an output signal (e.g. one of the plurality of pieces of estimation information) from present and past values of an input signal (e.g. the received absolute altitude information). Thus, the received absolute altitude information may for instance be used as the input information of the Kalman filter. The received relative altitude information may for instance be used as the dynamic model. One of the plurality of pieces of estimation information may be determined and be outputted by the Kalman filter as a result.

In case the obtaining of the plurality of pieces of estimation information comprises receiving the plurality of pieces of estimation information, the respective estimation information is received, e.g. from one or more electronic devices, or from a server. In this case, the electronic devices or the server may for instance have determined the estimation information in advance before providing the estimation information, e.g. to the apparatus performing and/or controlling the method according to the first aspect of the disclosure. Such a determining of estimation information of the plurality of pieces of estimation information is performed based, at least in part, on a relative altitude information and, at least in part, on an absolute altitude information, e.g. by using a Kalman filter as described above.

The relative altitude information may for instance be gathered, e.g. from a sensor (e.g. a barometric sensor) of an electronic device that provides the estimation information, e.g. to the apparatus performing and/or controlling the method according to the first aspect of the disclosure. The absolute altitude information may for instance be obtained from a database comprising altitude information, e.g. by an electronic device that provides estimation information (that has been determined based on the obtained absolute altitude information) to the apparatus performing and/or controlling the method according to the first aspect of the disclosure. The altitude information of the database may for instance be associated with a position information (e.g. a horizontal location), in particular in a way that based on the position information, a respective altitude value can be determined.

The estimation information may for instance be determined further based, at least in part, on a position information. The position information may for instance be obtained (e.g. received), e.g. from an electronic device, e.g. from an electronic device that also provides at least one piece of estimation information (or absolute and relative altitude information) to the apparatus that performs and/or controls the method according to the first aspect of the disclosure. The position information may for instance be indicative of a horizontal location, e.g. of an electronic device. The position information may for instance be indicative of a horizontal location (e.g. of an electronic device) outside (but in a vicinity) of a building. The position information may for instance be determined based on a Global Navigation Satellite System (GNSS), e.g. GPS, Galileo, Globalnaja nawigazionnaja sputnikowaja sistema (GLONASS), to name but a few examples. The position information may for instance be determined with a sensor (e.g. a GNSS sensor), which may for instance be part of the electronic device that provides at least one piece of estimation information to the apparatus that performs and/or controls the method according to the first aspect of the disclosure. A (GNSS) horizontal location, as used herein, may for instance refer to latitude/longitude coordinates.

The relative altitude information may for instance be determined, e.g. by using a processor. The processor may for instance be part of an electronic device of the one or more electronic devices providing the plurality of pieces of estimation information (or the absolute and relative altitude information) to an apparatus that performs and/or controls the method according to the first aspect of the disclosure. The relative altitude information may for instance be determined based on one or more pieces of pressure information (e.g. gathered by a pressure sensor—also referred to as barometric sensor, which may for instance be part of the electronic device the processor of which determines the relative altitude information). The relative altitude information may for instance represent altitude changes, but may not comprise or represent absolute altitude values.

An electronic device of the one or more electronic devices that provide the plurality of pieces of estimation information (or the absolute and relative altitude information) may for instance be portable (e.g. weigh less than 5, 3, 2, 1, or 0.5 kg). The electronic device may for instance be at least temporarily (e.g. in removable form) or permanently installed in a vehicle. The vehicle may for instance be a car, a truck, a motorcycle, a bicycle, a boat or a plane, to name but a few examples. The electronic device may for instance comprise or be connectable to a display for displaying a route that is guided/navigated to a user. The electronic device may for instance comprise or be connectable to means for outputting sound, e.g. in the form of spoken commands or information. The electronic device may for instance comprise or be connectable to one or more sensors for determining a position information indicative of the devices position, such as for instance a GNSS receiver, e.g. in the form of a GPS receiver. The electronic device may for instance comprise or be connectable to one or more sensors for determining the at least one pressure information, e.g. in the form of a barometric sensor. The electronic device may for instance be suitable for outdoor and for indoor navigation respectively positioning or for indoor navigation respectively positioning.

The absolute altitude information may for instance be indicative of an absolute value of an altitude. The absolute altitude information is associated with a data element of a database comprising map data representing an altitude map. The map data representing an altitude map is for instance available in case it has been generated in advance. The generated map data representing an altitude map can for instance be obtained, e.g. by the apparatus performing and/or controlling the method according to the first aspect of the disclosure. The generated map data representing an altitude map may for instance be obtained by sending a request for obtaining the generated map data representing an altitude map. The generated map data representing an altitude map may for instance be obtainable (e.g. by the apparatus performing and/or controlling the method according to the first aspect of the disclosure) by having access to the generated map data representing an altitude map, which may for instance be stored by another entity.

The absolute altitude information may for instance be determined by obtaining (e.g. receiving) an absolute altitude value, e.g. from the map data representing an altitude map. The absolute altitude value may for instance be obtained from another entity, e.g. a server.

Alternatively, the absolute altitude information may for instance be determined based on a position information. The absolute altitude information may for instance be determined based on a position information and the data element of the database comprising map data representing an altitude map. For instance, based on the position information, the absolute altitude value corresponding to the position information may be determined from the data element of the database comprising map data representing an altitude map. A position information may for instance stem from an electronic device of the one or more electronic devices providing the plurality of pieces of estimation information (or the absolute and relative altitude information). The position information may for instance be indicative of a horizontal location of an electronic device of these one or more electronic devices, but not of an absolute altitude value of the location of the electronic device. Based on the position information, the absolute altitude value at the horizontal location according to the position information can be determined out of the map data. The absolute value of the altitude at the location may for instance be determined by using the position information to obtain the absolute altitude value e.g. from an altitude map. The altitude map may for instance comprise at least one absolute altitude value associated with the position information, e.g. horizontal location (e.g. latitude and longitude coordinates).

Absolute altitude information associated with the data element of the database comprising map data representing an altitude map of adjacent map regions of the altitude map, do not change steeply in general. Thus, even if the position information is not accurate in relation to the correct location, an error of tens of meters according to the position information may only result in minor error (e.g. a few meters or less) in altitude represented by the absolute altitude information of the altitude map. The determined absolute altitude information associated with the data element is thus very precise compared to an altitude value provided by a GNSS.

The estimation information represents an absolute value of an altitude. The estimation information is determined based, at least in part, on the determined relative altitude information and, at least in part, on the determined absolute altitude information.

The plurality of pieces of estimation information are aggregated in a spatial grid. The spatial grid is divided into a plurality of grid points. Each of the grid points may for instance be adjacent to another grid point. The spatial grid may for instance be of regular type, wherein the grid points are evenly distributed (e.g. equidistant). Alternatively, the spatial grid may for instance be of irregular type, wherein the grid points are not evenly distributed (e.g. not equidistant).

The plurality of pieces of estimation information may for instance be aggregated in the spatial grid according to the respective position information (e.g. a horizontal location). The position information may for instance comprise latitude/longitude coordinates. Each combination of latitude/longitude coordinate may for instance represent one grid point of the spatial grid. In case two or more pieces of estimation information of the plurality of pieces of estimation information may be aggregated in the spatial grid to the same grid point, one absolute altitude value of the grid point may for instance be calculated. For instance, the absolute altitude value of the grid point may be calculated as an e.g. weighted average of the two or more of pieces of estimation information of the plurality of pieces of estimation information, which are aggregated in the spatial grid to the same grid point. The weights to calculate the weighted average may for instance be inversely proportional to uncertainties of each of the two or more estimation information. An uncertainty as used herein may for instance refer to a standard deviation of the two or more estimation information. The uncertainty may for instance be given in the unit of meters. Thus, the more an absolute altitude value of an estimation information deviates for instance from the mean average value at a grid point, the less this absolute altitude value may for instance be weighted. Further, the less an absolute altitude value of an estimation information deviates for instance from the mean average value at a grid point, the more this absolute altitude value may for instance be weighted.

Example embodiments of the present disclosure make it possible to accurately determine an altitude map based on crowd-sourced data, which is represented by the plurality of pieces of estimation information. This allows for easy access to altitude information, in particular in the vicinity of a building.

In particular, the steps of obtaining a plurality of pieces of estimation information and aggregating the plurality of pieces estimation information in a spatial grid, define an iteration step. By generating an altitude map based on a spatial grid obtained from such an iteration step, and using this altitude map in a further iteration step to obtain a new representation of the spatial grid allowing for generation of a new representation of the altitude map, the altitude map can be enhanced. This principle can be applied in a plurality of iteration steps, wherein the altitude map derived from a spatial grid of the previous iteration is used for the respective next iteration. Initially, when no altitude map is present, the obtaining of the plurality of pieces of estimation information and the aggregating of the plurality of pieces of estimation information may nevertheless be performed, wherein the absolute altitude information is then however not determined from an altitude map, but for instance from other map or sensor data (e.g. from a coarse GNSS-based altitude estimate).

Thus, the absolute altitude information of the altitude map converges to the actual altitude with each iteration performed. By using such an altitude map in positioning systems, very precise altitude estimation can be achieved. If this altitude map pertains to the vicinity of a building, the altitude information can be used as a starting point for determining/tracking the altitude at locations within the building.

According to an exemplary embodiment of all aspects of the present disclosure, the method further comprises, in case map data representing an altitude map is not available, and before the obtaining of the plurality of pieces of estimation information and the aggregating of the plurality of pieces of estimation information in the spatial grid, the following steps: obtaining a plurality of pieces of estimation information, the obtaining comprising receiving or determining the plurality of pieces of estimation information, wherein each of the plurality of pieces of estimation information represents one or more respective absolute values of an altitude, wherein each of the one or more absolute values of an altitude is associated with a respective position information, each of the plurality of pieces of estimation information determined based, at least in part, on a respective relative altitude information and, at least in part, on a respective absolute altitude information associated with a respective data element of a database comprising map data; and aggregating the plurality of pieces of estimation information in a spatial grid, wherein the spatial grid is divided into a plurality of grid points (as explained above, this spatial grid may serve as a basis for determining an altitude map that may then be used to determine the plurality of estimation information in/for the next step of obtaining a plurality of estimation information).

According to an exemplary embodiment of all aspects of the present disclosure, the method further comprises generating an altitude map based, at least in part, on the spatial grid.

Based on the spatial grid, in which the plurality of pieces of estimation information is aggregated, the altitude map may be generated, e.g. compiled. For instance, an altitude of each grid point of the grid may be represented by a function (e.g. an average) of the one or more pieces of estimation information respectively aggregated to this grid point. The generated altitude map may for instance consist of at least one altitude map, e.g. an altitude map limited to the vicinity of a building. The generated altitude map may for instance comprise a plurality of altitude maps. For instance, each of the plurality of altitude maps may be limited to the vicinity of a building. Thus, the generated altitude map may be patchy since it may be limited to the vicinity of each building comprised by the generated altitude map.

In an exemplary embodiment according to all aspects of the present disclosure, the aggregating further comprises allocating the plurality of pieces of estimation information to the grid points according to the respective position information.

For instance, the position information may comprise latitude/longitude coordinates. Thus, the position information may for instance be indicative to a horizontal location. Each grid point of the spatial grid may for instance be associated with a latitude/longitude coordinate. The allocating of the plurality of pieces of estimation information to the grid points may for instance be performed by addressing the grid point based, at least in part, on the position information, e.g. according to a latitude/longitude coordinates. Additionally, the grid points may for instance be associated with the absolute altitude value of the corresponding estimation information.

In order to allocate the plurality of pieces of estimation information to the grid points according to the position information, the position information may for instance be comprised by at least one of the plurality of pieces of estimation information.

In case two or more pieces of estimation information of the plurality of pieces of estimation information are allocated in the spatial grid to the same grid point, one absolute altitude value of the grid point may for instance be calculated, e.g. as a weighted average, for instance, calculated as described above.

According to an exemplary embodiment of all aspects of the present disclosure, the method further comprises interpolating grid points of the spatial grid at which no estimation information has been aggregated, to obtain an interpolated spatial grid.

After aggregating the plurality of pieces of estimation information in the spatial grid, not each grid point may be associated with an estimation information. By interpolating the grid points of the spatial grid to which no estimation information is aggregated, an estimation information indicative of an absolute value of an altitude may be constructed (e.g. interpolated) from the grid points to which an estimation information is aggregated. In this way, a full (interpolated) spatial grid can be achieved.

It should be noted that the steps of aggregating, allocating and/or interpolating can take place in sequence. For instance, after aggregating the plurality of pieces of estimation information, the allocating of the plurality of pieces of estimation information can be performed. After allocating the plurality of pieces of estimation information, the interpolating of the grid points may for instance be performed.

In an exemplary embodiment according to all aspects of the present disclosure, the obtaining of a plurality of pieces of estimation information and the aggregating of a plurality of pieces of estimation information form an iteration step, and wherein for a second such iteration step following a first such iteration step, the interpolated spatial grid obtained by interpolating grid points of the spatial grid of the first iteration step is used as the spatial grid when aggregating the plurality of pieces of estimation information. This principle can be applied in a plurality of iteration steps, wherein the interpolated spatial grid obtained by interpolating grid points of the spatial grid of the previous iteration is used for the respective next iteration.

Additionally, an altitude map may for instance be generated based on a spatial grid obtained from such a first iteration step, and using this altitude map in a further iteration step to obtain a new representation of the spatial grid allowing for generation of a new representation of the altitude map, the altitude map can be enhanced. This principle can be applied in a plurality of iteration steps, wherein the interpolated spatial grid obtained by interpolating grid points of the spatial grid of the previous iteration and the altitude map derived from a spatial grid of the previous iteration are used for the respective next iteration.

The interpolated spatial grid may for instance be comprised by the map data representing an altitude map. The map data representing an altitude map may for instance be generated (e.g. compiled) by performing the method according to the first aspect of the present disclosure for the first time, however with the modification that the absolute altitude information is not based on the—not yet available—altitude map, but on one or more other sources). In case the method according to the first aspect of the disclosure is performed and the map data representing an altitude map is available (e.g. an altitude map has been generated or otherwise been made available in advance of the performing of the method), the interpolated spatial grid of the available altitude map may for instance be used as the spatial grid when performing and/or controlling the aggregating of the plurality of pieces of estimation information.

The method according to the first aspect of the present disclosure may thus for instance be performed iteratively. With each iteration of the method, the interpolated spatial grid may for instance approximate the actual altitude even better. It will be understood that in advance of for instance generating an altitude map based, at least in part, on the spatial grid, the method according to the first aspect of the present disclosure may additionally or alternatively be performed recursively.

According to an exemplary embodiment of all aspects of the present disclosure, the grid points of the spatial grid are interpolated by a Kriging-interpolation.

Interpolating grid points of the spatial grid by using the Kriging-interpolation may for instance allow to interpolate grid points of the spatial grid to which no estimation information (e.g. absolute altitude value) is aggregated (e.g. allocated).

The Kriging-interpolation as used herein may refer to a statistical method of interpolation for which the interpolated values are modelled, e.g. by a Gaussian process. The Kriging-interpolation may for instance be a spatial Kriging-interpolation. The spatial Kriging-interpolation may for instance allow the interpolation of grid points of the spatial grid, e.g. to achieve a "full" grid, wherein every grid point of the spatial grid is associated with an absolute altitude information. The Kriging-interpolation may for instance provide smoothly varying interpolated grid points at the "empty" grid points. The Kriging-interpolation may for instance use absolute altitude information associated with nearby grid points of the "empty" grid points. The Kriging-interpolation may give a very accurate prediction of in particular intermediate values. Thus, by the Kriging-interpolation, very accurate absolute altitude values, for which no estimation information is obtained, may be interpolated. Alternatively, the interpolation may for instance be performed by a regression technique or the like to name but an example.

In an exemplary embodiment according to all aspects of the present disclosure, the altitude map represents a map region. Additionally, the altitude map may represent a map region associated with at least one absolute altitude information. The altitude map may for instance be part of a venue map, e.g. used in indoor navigation and/or positioning services. The map region may for instance be limited to the vicinity of a building. Such an altitude map may also be referred to as neighbourhood altitude map.

According to an exemplary embodiment of all aspects of the present disclosure, the method further comprises determining a plurality of pieces of combined uncertainty information based, at least in part, on the plurality of pieces estimation information, wherein each of the combined uncertainty information represents a standard deviation with respect to a respective position information; and aggregating the plurality of pieces of combined uncertainty information in an uncertainty grid, wherein the uncertainty grid is divided into a plurality of grid points.

The plurality of pieces of combined uncertainty information may for instance be aggregated in the uncertainty grip according to the position information (e.g. a horizontal location). The position information may for instance comprise latitude/longitude coordinates. Each combination of latitude/longitude coordinate may for instance represent one grid point of the uncertainty grid.

It should be noted that the step of aggregating the plurality of pieces of estimation information in the spatial grid and the step of aggregating the plurality of pieces of combined uncertainty information in the uncertainty grid can take place in parallel. Additionally or alternatively, the step of allocating the plurality of pieces estimation information and the step of allocation the plurality of pieces of combined uncertainty information can take place in parallel. Additionally or alternatively, the step of interpolating grid points of the spatial grid and the step of interpolating grid points of the uncertainty grid can take place in parallel.

According to an exemplary embodiment of all aspects of the present disclosure, the method further comprises interpolating grid points of the uncertainty grid at which no combined uncertainty information has been aggregated.

After aggregating the plurality of pieces of combined uncertainty information in the uncertainty grid, not each grid point may be associated with a combined uncertainty information. By interpolating the grid points of the uncertainty grid to which no combined uncertainty information is aggregated, a combined uncertainty information indicative of an uncertainty may be constructed (e.g. interpolated) from the grid points to which a combined uncertainty information is aggregated. In this way, a full aggregated uncertainty grid can be achieved.

In an exemplary embodiment according to all aspects of the present disclosure, the spatial grid and the uncertainty grid have spatially co-located grid points. In this way, each of the plurality of pieces of estimation information and the determined plurality of pieces of uncertainty information may for instance be associated with respectively the same grid point. A grid point of the spatial grid can be easily mapped to the corresponding grid point of the uncertainty grid.

According to an exemplary embodiment of all aspects of the present disclosure, the generating of the altitude map is further based on the uncertainty grid.

In case two or more pieces of estimation information of the plurality of pieces of estimation information are aggregated in the spatial grid to the same grid point, one absolute altitude value of the grid point may for instance be calculated. For instance, the absolute altitude value of the grid point may be calculated as a weighted average of the two or more estimation information of the plurality of pieces of estimation information, which are aggregated in the spatial grid to the same grid point. The weights to calculate the weighted average may for instance be inversely proportional to uncertainties of each of the two or more estimation information. The uncertainty of each of the two or more estimation information may for instance be based, at least in part, on the uncertainty grid. In this way, a very accurate altitude map can be generated. This altitude map may for instance be divided in grid points to which one absolute altitude value is associated with. Additionally or alternatively, in case two or more pieces of estimation information of the plurality of pieces of estimation information are aggregated in the spatial grid to the same grid point, one absolute value of the grid point may for instance be calculated by using a Kalman filter.

For instance, the Kalman filter determines an output signal (e.g. the one absolute altitude value of the grid point) from present and past values of an input signal (e.g. two or more pieces of estimation information of the plurality of pieces of estimation information aggregated in the spatial grid to the same grid point).

In an exemplary embodiment of all aspects of the present disclosure, as an input of the Kalman filter, at least one piece of estimation information and at least one uncertainty of the at least one piece of estimation information and a further piece of estimation information and its uncertainty may for instance be used. The at least one piece of estimation information may for instance represent the output of already filtered one or more pieces of estimation information by the Kalman filter (e.g. the 'measurement history'). The further piece of estimation information may for instance be obtained based, at least in part, on a position information and may for instance represent a new altitude measurement. The position information may for instance be determined based on a GNSS, so it has uncertainty as already described. Based on the input, the Kalman filter may for instance combine the two or more pieces of estimation information (e.g. the at least one piece of estimation information and the further piece of estimation information) optimally. Thus, one absolute altitude value of a grid point may for instance be calculated by the Kalman filter based, at least in part, on the two or more pieces of estimation information, and additionally based, at least in part, one each of the uncertainties of the two or more pieces of estimation information.

According to an exemplary embodiment of all aspects of the present disclosure, the method comprises, prior to the interpolating of the grid points of the spatial grid, smoothing at least some (or all) grid points of the spatial grid.

The smoothing of at least some of the grid point of the spatial grid may for instance be performed by using a Kalman filter.

For instance, the Kalman filter determines an output signal (e.g. the smoothed estimation information) from present and past values of an input signal (e.g. the obtained estimation information). The plurality of pieces of obtained estimation information may for instance be used as an input signal of the Kalman filter. Additionally, the relative altitude information may for instance be used to determine the dynamic model (e.g. a state transition model) of the Kalman filter in order to determine the smoothed estimation information. In such a way, the accurateness of the absolute altitude value of the smoothed estimation information is enhanced.

The smoothing of at least some grid points of the spatial grid may for instance take place in advance of aggregating the plurality of pieces of estimation information.

According to an exemplary embodiment of all aspects of the present disclosure, the method comprises, prior to the interpolating of the grid points of the uncertainty grid, smoothing at least some (or all) grid points of the uncertainty grid.

The smoothing of at least some grid point of the uncertainty grid may for instance be performed by using a Kalman filter.

For instance, the Kalman filter determines an output signal (e.g. the smoothed combined uncertainty information) from present and past values of an input signal (e.g. the plurality of pieces of combined uncertainty information). The plurality of pieces of combined uncertainty information, which may be determined, may for instance be used as an input signal of the Kalman filter. Additionally, the relative altitude information may for instance be used to determine the dynamic model (e.g. a state transition model) of the Kalman filter in order to determine the smoothed combined uncertainty information. In such a way, the accurateness of the combined uncertainty information is enhanced.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION

The following description serves to deepen the understanding of the present disclosure and shall be understood to complement and be read together with the description of the disclosure as provided in the above summary section of this specification.

Figure 1:
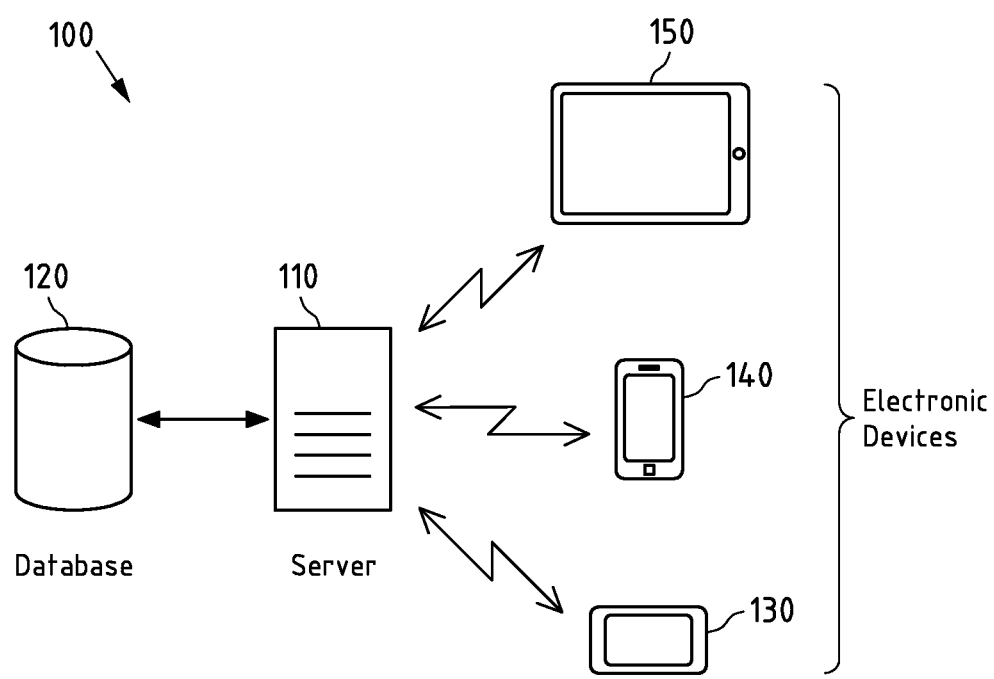
FIG. 1 a schematic block diagram of a system according to an exemplary aspect of the present disclosure.

FIG. 1 is a schematic block diagram of a system according to an exemplary embodiment of the present disclosure. System 100 comprises a server 110, which may alternatively be embodied as a server cloud (e.g. a plurality of servers connected e.g. via the internet and providing serves at least partially jointly), a database 120, which may be connected to the server e.g. via the internet and allowing access from the server 110 to data of the database 120, alternatively the database 120 may be embodied e.g. in the server 110, and an electronic device, of which three different realizations are shown as an example: a portable navigation device 130, a mobile device 140 and a tablet 150.

According to an example embodiment, electronic device 130, 140, 150 may store map data, e.g. provided by server 110. Communication, e.g. for the transmission of the map data, between server 110 and electronic device 130, 140, 150 may for instance take place at least partially in a wireless function, e.g. based on cellular radio communication or on Wireless Local Area Network (WLAN) based communication, to name but a few examples. Map data may comprise at least one data element. Map data may for instance represent at least one altitude map, e.g. a map region associated with at least one altitude information. Further, map data may comprise an absolute altitude information, e.g. an altitude value. The absolute altitude information may for instance be associated with the data element. Additionally, map data may for instance comprise at least one altitude value relative to a main floor of a building and/or at least one altitude value relative to sea level. Each of the altitude values relative to a main floor of a building and/or relative to sea level may for instance be associated with the data element. Map data may for instance comprise one or more building boundaries. At least one absolute altitude value may for instance be associated with a data element outside of the one or more building boundaries.

The electronic device 130, 140, 150 may be configured to receive at least one data element, e.g. from server 110. At least one data element and/or map data may be stored in database 120, and may be provided to electronic device 130, 140, 150 via server 110. In this way, e.g. an absolute altitude information associated with a data element may be determined based on a position information from the map data stored in a database, e.g. by server 110. The determined absolute altitude information may for instance be provided as a service, e.g. from server 110, to one or more electronic devices, e.g. electronic devices 130, 140, 150, of one or more users.

Figure 2:
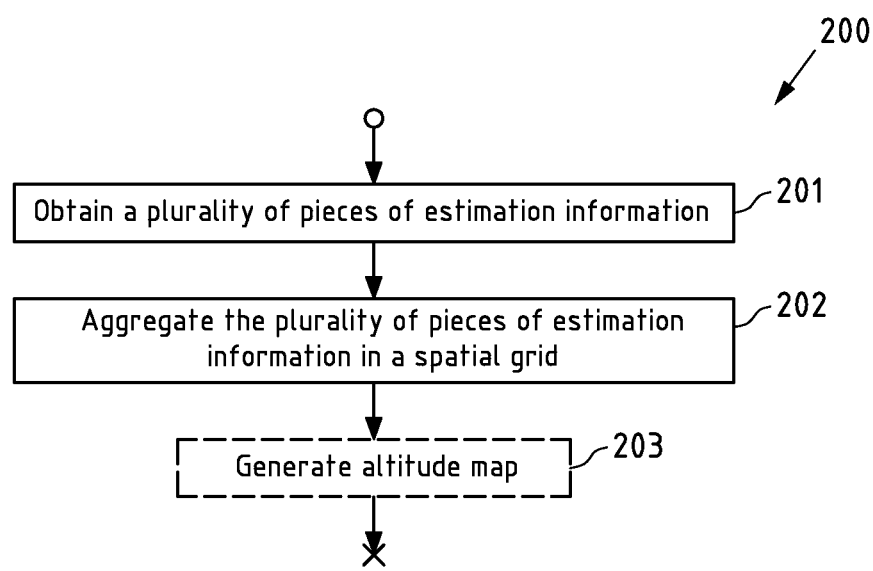
FIG. 2 a flowchart showing an example embodiment of a method according to the first exemplary aspect of the present disclosure.

FIG. 2 is a flowchart 200 showing an example embodiment of a method according to the first exemplary aspect of the present disclosure. This method may for instance be performed by server 110 of FIG. 1.

In step 201, a plurality of pieces of estimation information are obtained (e.g. determined). Each of the plurality of pieces of estimation information represents one or more values of an altitude. Further, each of the one or more absolute values of an altitude is associated with a position information. In case the obtaining of the plurality of pieces of estimation information comprises determining, each of the plurality of pieces of estimation information is determined based, at least in part, on a relative altitude information and, at least in part, on an absolute altitude information, wherein the absolute altitude information is associated with a data element of a database (e.g. database 120 of FIG. 1) comprising map data representing an altitude map. The relative altitude information may for instance be indicative of altitude changes. It may for instance be measured at the electronic device 130, 140, 150 and provided to server 110. The absolute altitude information may for instance be indicative of an absolute value of an altitude. It may for instance be derived from an altitude map (except in case such an altitude map is not available when step 201 is carried out, in which case the absolute altitude information is for instance determined otherwise), for instance based on a position information provided by electronic device 130, 140, 150.

In step 202, the plurality of pieces of estimation information are aggregated in a spatial grid. The spatial grid is divided into a plurality of grid points. Each of the grid points may for instance be associated with a position information (e.g. a horizontal location), e.g. represented by a latitude/longitude coordinate. Each of the grid points may for instance comprise or be associated with an absolute value of an altitude.

In optional step 203, an altitude map is generated (e.g. by server 110 of FIG. 1). The altitude map may for instance be generated based on the spatial grid. The altitude map (or a processed representation thereof) may then for instance be used in a subsequent execution of step 201, in particular if the flowchart 200 is executed iteratively.

Figure 3:
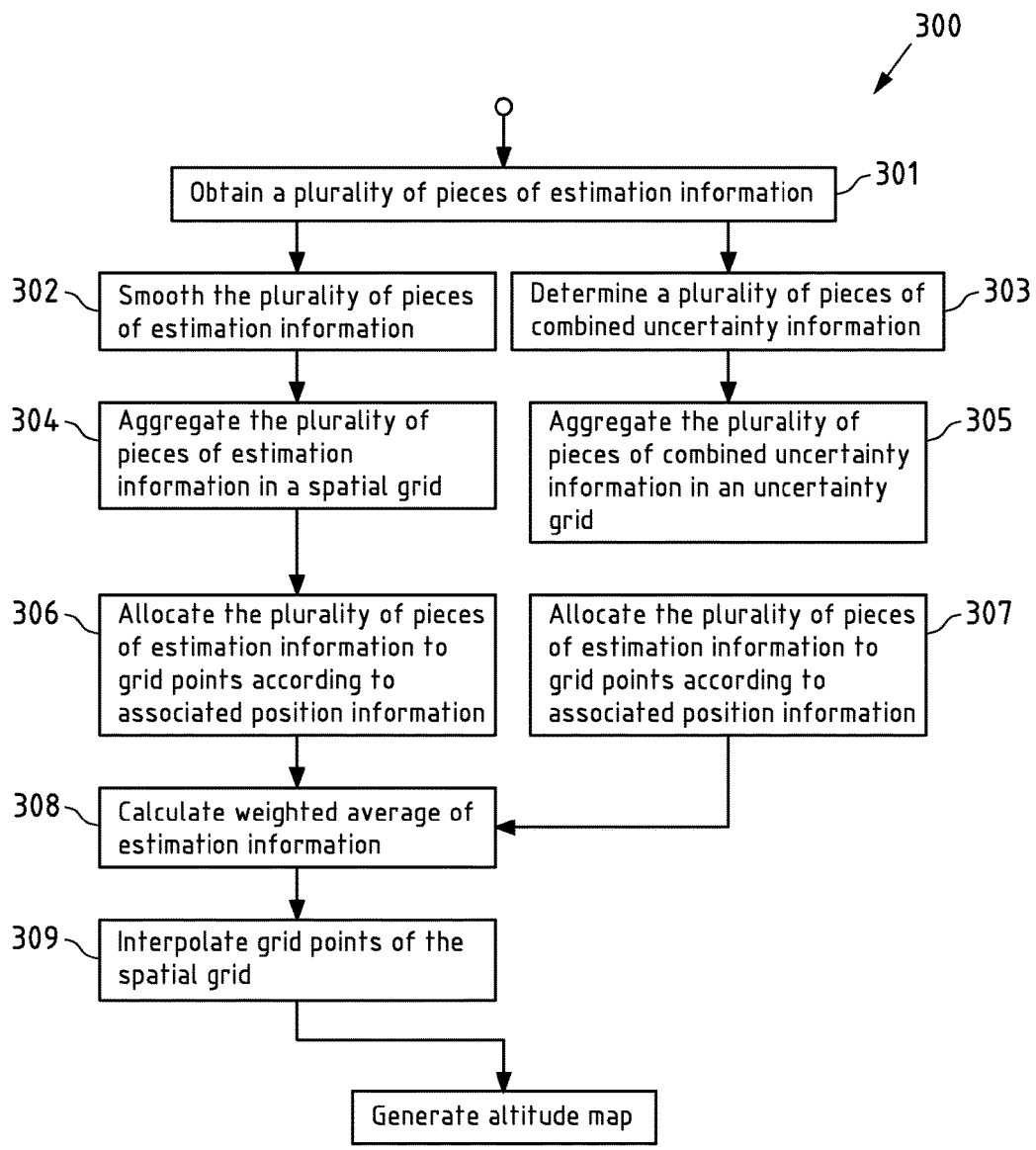
FIG. 3 a flowchart showing a further example embodiment of a method according to the first exemplary aspect of the present disclosure.

FIG. 3 is a flowchart 300 showing a further example embodiment of a method according to the first exemplary aspect of the present disclosure. Flowchart 300 may for instance be performed by server 110 of FIG. 1.

In step 301, a plurality of pieces of estimation information are obtained, e.g. received from electronic devices (e.g. electronic devices 130, 140, 150 of FIG. 1).

In step 302, the obtained plurality of pieces of estimation information are smoothed (e.g. filtered). For smoothing the plurality of pieces of estimation information, for instance a Kalman filter may be used.

The smoothed plurality of pieces of estimation information is aggregated in a spatial grid in step 304.

In step 303, which can take place in parallel to step 302, a plurality of pieces of combined uncertainty information is determined. Since multiple estimation information may be aggregated in the same grid point, a combined absolute altitude value, e.g. associated with that grid point, may for instance be calculated. The combined absolute altitude value may for instance be calculated as a weighted average of absolute altitude values of individual estimation information. The weights may for instance be inversely proportional to uncertainties (e.g. standard deviation in meters) of the individual estimation information. These uncertainties are determined in step 303.

In step 305, which can take place in parallel to step 304, the plurality of pieces of combined uncertainty information is aggregated in an uncertainty grid.

The spatial grid and the uncertainty grid may for instance be divided equally.

In step 306 and 307, which can take place in parallel, the plurality of pieces of estimation information and the plurality of pieces of combined uncertainty information are allocated to grid points of the spatial grid and the uncertainty grid according to associated position information. The position information may for instance be part of the obtained estimation information.

In step 308, the weighted average of estimation information is calculated. In the flowchart 300, step 308 is performed subsequent to allocating (e.g. steps 306 and 307). Alternatively, step 308 may be performed prior to allocating (e.g. steps 306 and 307).

The spatial grid associated with absolute values of an altitude of the plurality of pieces of estimation information and the uncertainty grid associated with the determined plurality of pieces of combined uncertainty information may for instance be further refined (e.g. smoothed and/or interpolated), e.g. with spatial Kriging-interpolation in step 309.

In step 310, which may be optional, an altitude map is generated. The altitude map may for instance be generated based on the interpolated spatial grid.

Figure 4:
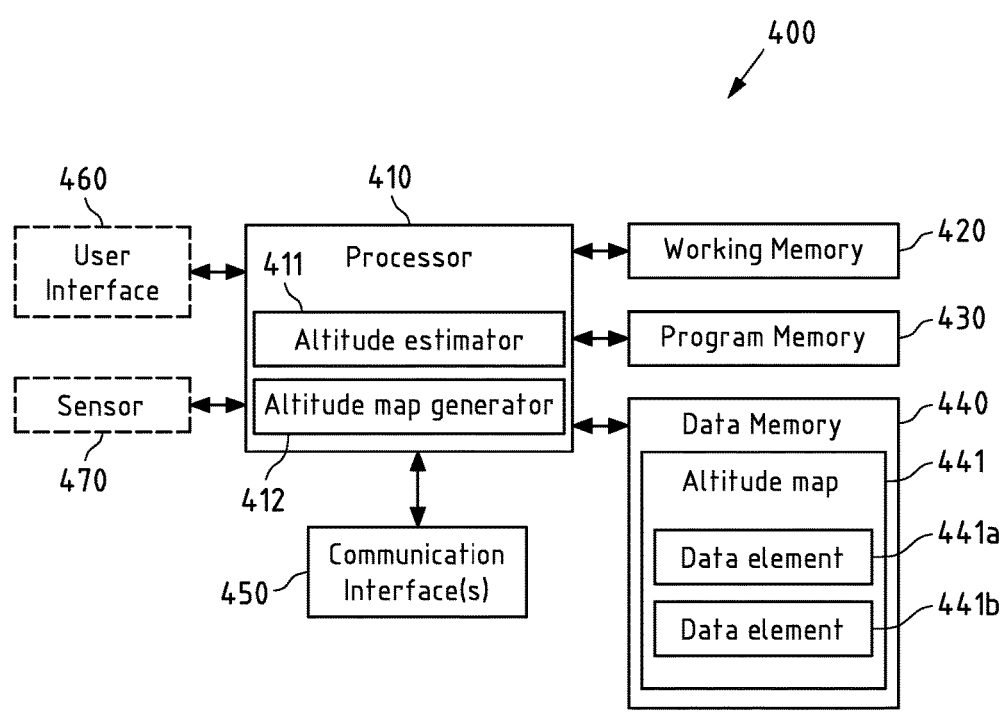
FIG. 4 a schematic block diagram of an apparatus according to an exemplary aspect of the present disclosure.

FIG. 4 is a schematic block diagram of an apparatus 400 according to an exemplary aspect of the present disclosure, which may for instance represent server 110 of FIG. 1.

Apparatus 400 comprises a processor 410, working memory 420, program memory 430, data memory 440, communication interface(s) 450, an optional user interface 460 and an optional sensor 470.

Apparatus 400 may for instance be configured to perform and/or control or comprise respective means (at least one of 410 to 470) for performing and/or controlling the method according to the first exemplary aspect. Apparatus 400 may as well constitute an apparatus comprising at least one processor (410) and at least one memory (420) including computer program code, the at least one memory and the computer program code configured to, with the at least one processor, cause an apparatus, e.g. apparatus 400 at least to perform and/or control the method according to first exemplary aspect of the disclosure.

Processor 410 may for instance comprise an altitude estimator 411 as a functional and/or structural unit. Altitude estimator 411 may for instance be configured to obtain (e.g. determine) an estimation information (see step 201 of FIG. 2). Processor 410 may for instance comprise an altitude map generator 412 as a functional and/or structural unit. Altitude map generator 412 may for instance be configured to generate an altitude map (see step 203 of FIG. 2). Processor 410 may for instance further control the memories 420 to 440, the communication interface(s) 450, the optional user interface 460 and the optional sensor 470.

Processor 410 may for instance execute computer program code stored in program memory 430, which may for instance represent a computer readable storage medium comprising program code that, when executed by processor 410, causes the processor 410 to perform the method according to the first exemplary aspect.

Processor 410 (and also any other processor mentioned in this specification) may be a processor of any suitable type. Processor 410 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 410 may for instance be an application processor that runs an operating system.

Program memory 430 may also be included into processor 410. This memory may for instance be fixedly connected to processor 410, or be at least partially removable from processor 410, for instance in the form of a memory card or stick. Program memory 430 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 430 may also comprise an operating system for processor 410. Program memory 430 may also comprise a firmware for apparatus 400.

Apparatus 400 comprises a working memory 420, for instance in the form of a volatile memory. It may for instance be a Random Access Memory (RAM) or Dynamic RAM (DRAM), to give but a few non-limiting examples. It may for instance be used by processor 410 when executing an operating system and/or computer program.

Data memory 440 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 340 may for instance store map data 441. Map data 441 may for instance represent an altitude map. Map data 341 may comprise one or more data elements, e.g. data elements 441a and 441b. Each data element stored in data memory 440 may for instance represent at least one map region. Further, an absolute altitude information may be associated with each of the data elements. Further, each at least one map region of a data element may border to another at least one map region of a further data element.

Communication interface(s) 450 enable apparatus 400 to communicate with other entities, e.g. with electronic device 130, 140, 150 of FIG. 1 or server 110 of FIG. 1. The communication interface(s) 450 may for instance comprise a wireless interface, e.g. a cellular radio communication interface and/or a WLAN interface) and/or wire-bound interface, e.g. an IP-based interface, for instance to communicate with entities via the Internet. Communication interface(s) may enable apparatus 400 to communicate with other entities, for instance with electronic device 130, 140, 150 of FIG. 1 or server 110 of FIG. 1.

User interface 460 is optional and may comprise a display for displaying information to a user and/or an input device (e.g. a keyboard, keypad, touchpad, mouse, etc.) for receiving information from a user.

Sensor 470 is optional and may for instance comprise a barometric sensor, e.g. to gather pressure information. Sensor 470 may for instance be part of an electronic device, e.g. electronic device 130, 140, 150 of FIG. 1.

Some or all of the components of the apparatus 400 may for instance be connected via a bus. Some or all of the components of the apparatus 400 may for instance be combined into one or more modules.

Figure 5:
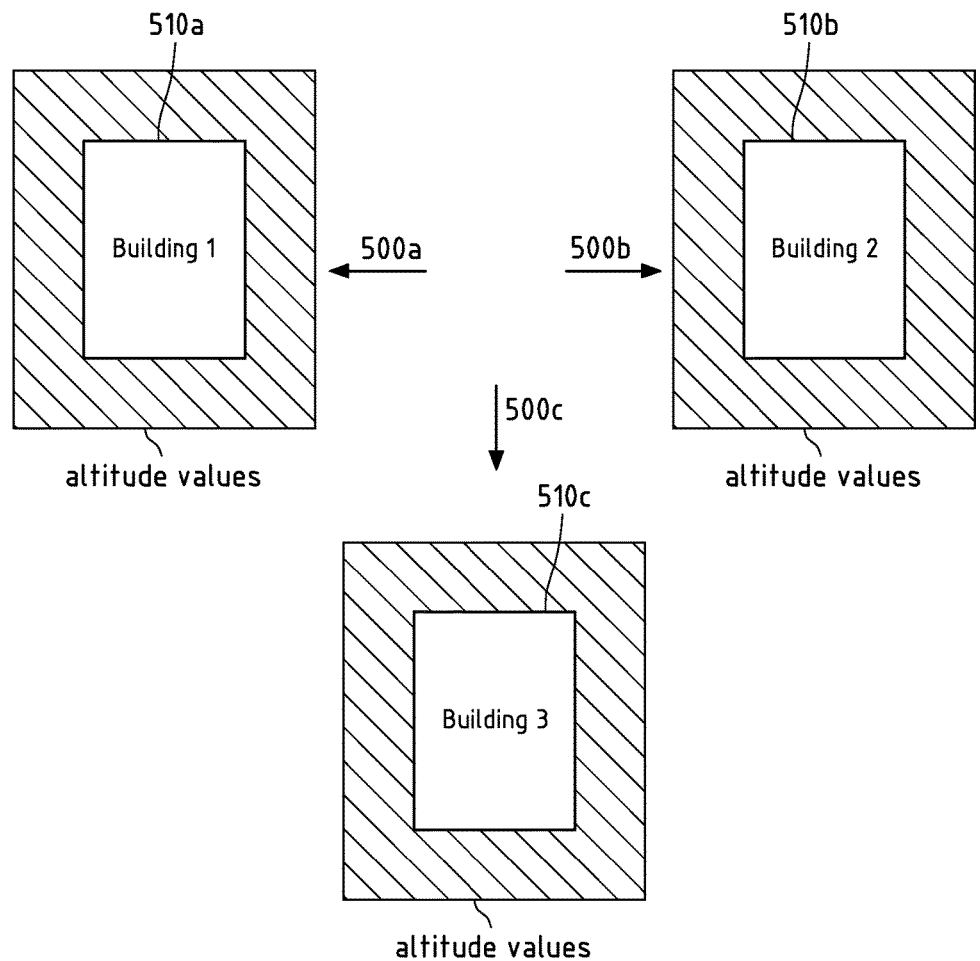
FIG. 5 a schematic example of an altitude map used in an exemplary embodiment of a method according to the first aspect of the present disclosure.

FIG. 5 shows a schematic example of an altitude map used in an exemplary embodiment of a method according to the first aspect of the present disclosure.

The altitude map of FIG. 5 comprises three buildings 510a, 510b, 510c, which are located at the map region represented by the altitude map. The hatched areas 500a, 500b, 500c around each of the buildings 510a, 510b, 510c depicts an altitude map for the building itself.

The altitude map depicted by the hatched area may for instance be comprised by a radio map of a venue (e.g. building). In this way, the altitude map is easily accessible for indoor positioning services. Further, there may be no need to have access to global altitude information, e.g. which may be used for determining an altitude based on a position information obtained by a GNSS.

The altitude map of FIG. 5 may for instance be a so-called "global" altitude map. The global altitude map may for instance consist of three further altitude maps, one for each building. The absolute altitude information of the altitude map may for instance be associated with one or more data elements of a database comprising map data.

An altitude map (e.g. the altitude map shown in FIG. 5) may for instance be generated based on a plurality of estimation information. The data necessary for determining each of the pieces of estimation information may for instance be crowd-sourced (e.g. harvested), e.g. based on data gathered by a plurality of electronic devices.

The estimation information (e.g. crowd-sourced) may for instance comprise a plurality of pieces of position information representing a track along which a user (in particular the electronic device of the user) has moved.

The estimation information may for instance be determined based on at least one relative altitude information. The relative altitude information may for instance be determined based on at least one pressure information. The at least one pressure information may for instance be obtained (e.g. gathered) from a sensor, e.g. a sensor of the electronic device. The sensor may for instance be a pressure sensor—also referred to as barometric sensor. The relative altitude information may for instance comprise consecutive relative altitude values, as changes in the atmospheric pressure. The relative altitude information may for instance be gathered by the sensor. The relative altitude information may for instance provide relative altitude changes, but not absolute altitude information (e.g. absolute altitude values).

The estimation information may for instance be determined based, at least in part, on at least one absolute altitude information, e.g. obtained from a data element of a database comprising map data. Additionally, the estimation information may for instance be determined based, at least in part, on at least one relative altitude information and based, at least in part, on a position information (e.g. a horizontal location). The map data may for instance represent an altitude map.

The estimation information may for instance be determined by using a Kalman filter. For instance, the position information may for instance be used as a measurement model of the Kalman filter. Additionally, the at least one relative altitude information may for instance be used as a dynamic model (e.g. state-transition model) of the Kalman filter. In this way, the pieces of estimation information provide very accurate absolute altitude values, and smoothness of the altitude estimates.

Additionally, the estimation information may for instance be determined based, at least in part, on at least one (e.g. pre-defined) pressure information. The at least one pressure information may for instance comprise the atmospheric pressure at sea level. The at least one pressure information may for instance comprise the atmospheric pressure at sea level at the corresponding (e.g. same) time at which the at least one relative altitude information was determined. Additionally or alternatively, the at least one pressure information may for instance comprise the atmospheric pressure at sea level at the corresponding (e.g. same) region at which the at least one relative altitude information was determined.

The position information may for instance be a horizontal location, e.g. defined by a combination of latitude and longitude coordinates.

Figure 6:
FIG. 6 a schematic example of a plurality of pieces of estimation information used in an example embodiment of a method according to the first aspect of the present disclosure.

FIG. 6 shows a schematic example of a plurality of pieces of estimation information used in an example embodiment of a method according to the first aspect of the present disclosure.

Each of the plurality of estimation information plotted in FIG. 6 represents a track along which a user (in particular the electronic device of the user) has moved. Each track comprises symbols of different shape, wherein each shape represents an absolute altitude value. At hand, each absolute altitude value was determined based, at least in part, on a position information (e.g. a horizontal location) and a relative altitude information.

FIG. 6 shows that at one specific horizontal location, there might be different absolute altitude values determined by the electronic devices. One reason may be that an initial estimation information may depend heavily on absolute altitude information provided by a GNSS, which was additionally used for obtaining the position information.

Figure 7B:
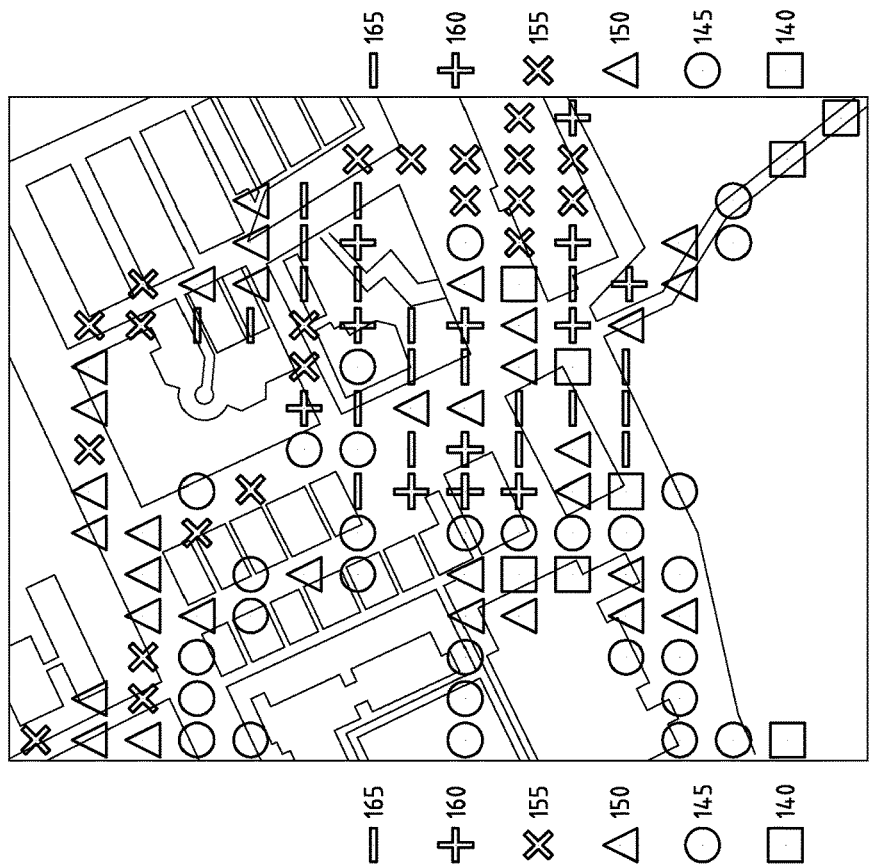
FIG. 7b a schematic example of a plurality of pieces of combined uncertainty information divided into a uncertainty grid used in an example embodiment of a method according to the first aspect of the present disclosure.
Figure 7A:
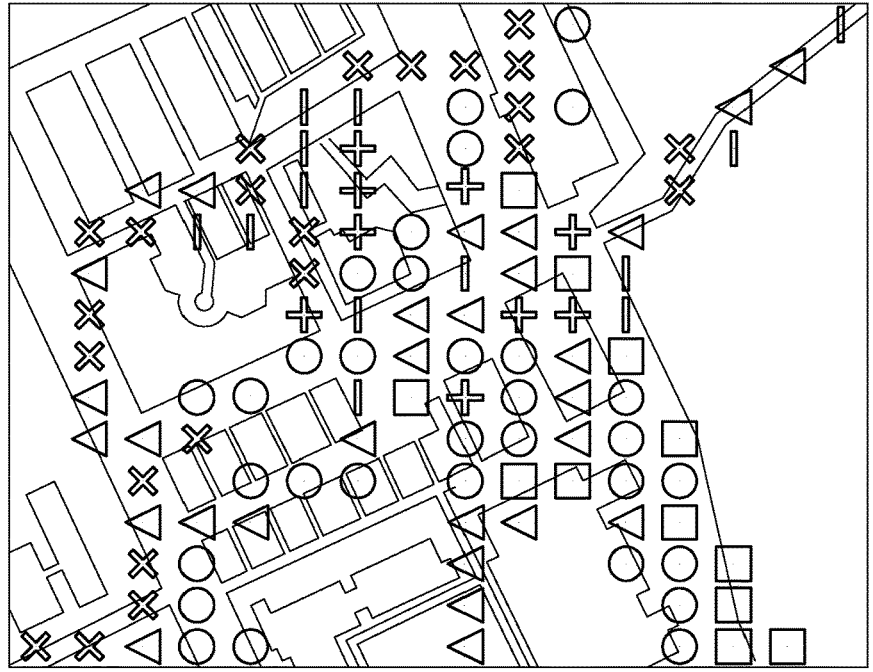
FIG. 7a a schematic example of a plurality of pieces of estimation information divided into a spatial grid used in an example embodiment of a method according to the first aspect of the present disclosure.

In order to generate the altitude map as accurate as possible, each of the plurality of estimation information is aggregated in a spatial grid, as it is shown in FIG. 7a and FIG. 7b.

FIG. 7a shows a schematic example of a plurality of pieces of estimation information divided into a spatial grid used in an example embodiment of a method according to the first aspect of the present disclosure, which have been aggregated in a spatial grid of an example embodiment of a method according to the first aspect.

The spatial grid of FIG. 7a is divided into a plurality of grid points. Each grid point of the spatial of FIG. 7a represents a horizontal position. Since multiple different absolute altitude values of the estimation information may be allocated to the same point of the spatial grid, one representative absolute altitude value at that point of the spatial grid needs to be determined.

The one representative absolute altitude value may for instance be determined by calculating a weighted average of each individual absolute altitude value of the plurality of absolute altitude information. The weighting may for instance be performed by weighting each individual absolute altitude value of the plurality of absolute altitude information inversely proportional to uncertainties of the individual absolute altitude values of the plurality of absolute altitude information. The uncertainties of the individual absolute altitude values of the plurality of absolute altitude information may for instance be indicative of the standard deviation of the absolute altitude values of the plurality of estimation information. For instance, the absolute altitude values deviating the most from a reference value (e.g. arithmetic median or median) may be weighted the least, and the absolute altitude values deviating the least from the reference value may be weighted the most.

Alternatively, the weighting may for instance be performed by weighting each individual absolute altitude value of the plurality of pieces of absolute altitude information based on uncertainties of the individual absolute altitude values of the plurality of absolute altitude information, which may for instance be a function of the arrangement of the satellites in the sky (geometry) and the signal-to-noise-ratio of the satellite signals. This weighting may for instance be performed in case the plurality of pieces of absolute altitude information are value provided by a GNSS.

In an exemplary embodiment of a method according to the first aspect of the disclosure, the uncertainties of the individual absolute altitude values of the plurality of absolute altitude information are aggregated into an uncertainty grid, for instance shown in FIG. 7b.

Figure 8B:
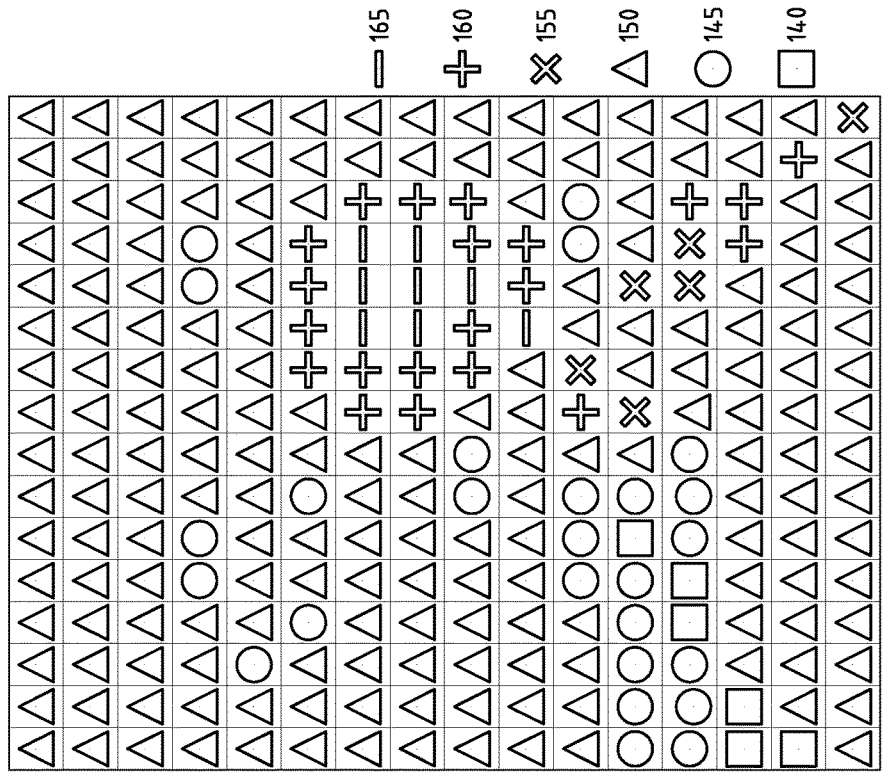
FIG. 8b a schematic example of the plurality of estimation information of FIG. 8a interpolated and generated into an altitude map according to an example embodiment of a method according to the first aspect of the present disclosure.
Figure 8A:
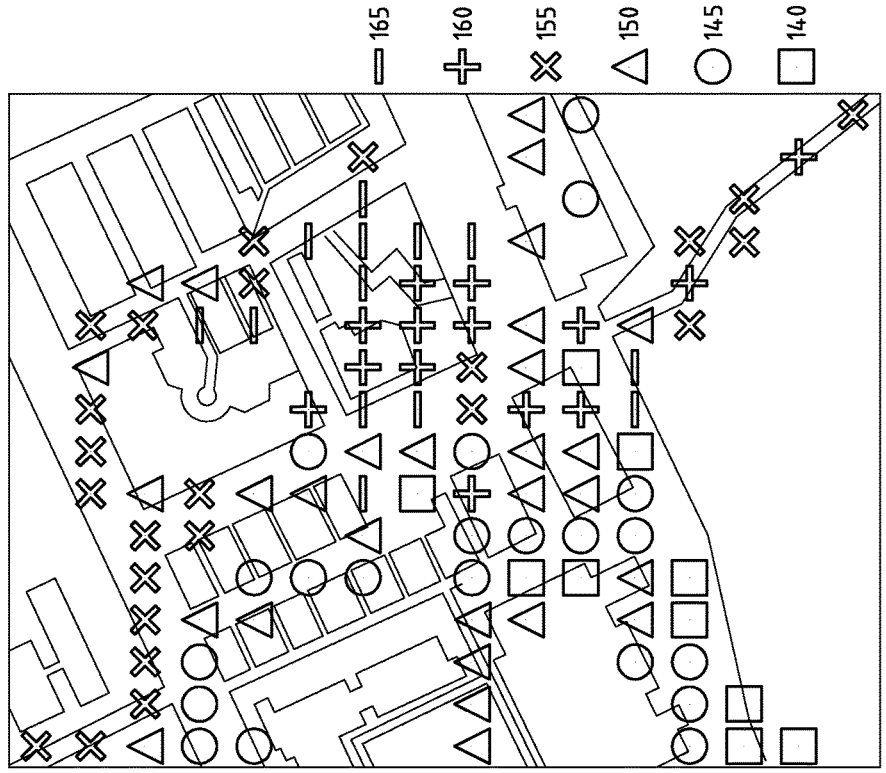
FIG. 8a a schematic example of the plurality of pieces of estimation information of FIG. 7a filtered according to an example embodiment of a method according to the first aspect of the present disclosure.

The spatial grid of FIG. 7a may for instance be further refined (e.g. smoothed and interpolated), e.g. with a Kriging-interpolation method (cf. FIG. 8a and FIG. 8b).

FIG. 7b shows a schematic example of a plurality of pieces of combined uncertainty information divided into an uncertainty grid used in an example embodiment of a method according to the first aspect of the present disclosure.

The uncertainties of the individual absolute altitude values of the plurality of absolute altitude information are combined, e.g. determining the absolute range in which the absolute altitude values of the plurality of estimation information deviate from each other at a given point of the uncertainty grid.

FIG. 8a shows a schematic example of the plurality of pieces of estimation information of FIG. 7a filtered according to an example embodiment of a method according to the first aspect of the present disclosure Thus, FIG. 8a shows a schematic example of a smoothed spatial grid, generated based on the spatial grid of FIG. 7a.

FIG. 8b shows the spatial grid of FIG. 8a, which is interpolated so that each point of the spatial grid is associated with an absolute altitude value and generated into an altitude map according to an example embodiment of a method according to the first aspect of the present disclosure.

The interpolated spatial grid, e.g. shown in FIG. 8b, may for instance be used as an altitude map. The altitude map comprises aggregated and 'averaged' (e.g. by weighting as described for instance in conjunction with FIG. 7a) based on a plurality of estimation information. If the altitude map is generated, e.g. according to the method according to the first aspect of the disclosure, the next time the method according to the first aspect of the disclosure is performed, the absolute altitude information comprised by the altitude map may for instance be combined with a further plurality of pieces of estimation information. Iteratively performing the method according to the first aspect of the disclosure may thus result in an enhanced altitude map after every iteration.

Specifically, when a position information (e.g. a horizontal position) is derived from a GNSS, the position information may for instance be indicative of a combination of a latitude and longitude coordinates within the altitude map (e.g. the map region represented by the altitude map), and this altitude information may for instance be used in addition to an absolute altitude value derived from the GNSS. For instance, an absolute altitude value derived from the GNSS and an absolute altitude value determined from an altitude map may for instance be combined by using a Kalman filter. For instance, both absolute altitude values may for instance be considered as consecutive absolute altitude values (e.g. consecutive measurements of the atmospheric pressure), and those consecutive absolute altitude values could be used one after another to update the Kalman filter. In this way, as the altitude map provides more accurate information than individual GNSS estimates (e.g. difference between GPS altitude values at the same location can be tens of meters). Since the generated altitude map contains averaged absolute altitude information from a plurality of electronic devices, wherein each of the plurality of electronic devices gathered altitude information (e.g. relative altitude information and/or absolute altitude information) at the same location (e.g. horizontal location), but at different times and/or conditions, very accurate absolute values of an altitude can be achieved. These absolute values of an altitude are based on (randomly) crowd-sourced data and can be generated into an altitude map.

In an exemplary embodiment according to all aspects of the present disclosure, an altitude map (e.g. a venue neighbourhood altitude map) that has the following properties may be used:
 the altitude map is not a global one, but limited to the vicinity of a building (e.g. the altitude map may be patchy);
 the altitude map is not applicable inside of the building;
 the altitude map may be derived
  from a global altitude map
  from crowd-sourced data: For instance, GNSS-based position information (e.g. a horizontal location) and a pressure information (e.g. obtained by a pressure sensor) and building coverage information;
 data presentation may be embedded in one or more indoor maps.

The following embodiments shall also be considered to be disclosed:

Embodiment 1

An apparatus comprising at least one processor and at least one memory including computer program code; the at least one memory and the computer program code configured to, with the at least one processor, cause the apparatus to at least perform:
 obtaining a plurality of pieces of estimation information, the obtaining comprising receiving or determining the plurality of pieces of estimation information, wherein each of the plurality of pieces of estimation information represents one or more respective absolute values of an altitude, wherein each of the one or more absolute values of an altitude is associated with a respective position information, each of the plurality of pieces of estimation information determined based, at least in part, on a respective relative altitude information and, at least in part, on a respective absolute altitude information associated with a respective data element of a database comprising map data representing an altitude map; and aggregating the plurality of pieces of estimation information in a spatial grid, wherein the spatial grid is divided into a plurality of grid points.

Embodiment 2

The apparatus according to embodiment 1, the at least one memory and the computer program code configured to, with the at least one processor, cause the apparatus to at least further perform, in case that map data representing an altitude map is not available, and before the obtaining of the plurality of pieces of estimation information and the aggregating of the plurality of pieces of estimation information in the spatial grid, the following:
  obtaining a plurality of pieces of estimation information, the obtaining comprising receiving or determining the plurality of pieces of estimation information, wherein each of the plurality of pieces of estimation information represents one or more respective absolute values of an altitude, wherein each of the one or more absolute values of an altitude is associated with a respective position information, each of the plurality of pieces of estimation information determined based, at least in part, on a respective relative altitude information and, at least in part, on a respective absolute altitude information associated with a respective data element of a database comprising map data; and
  aggregating the plurality of pieces of estimation information in a spatial grid, wherein the spatial grid is divided into a plurality of grid points.

Embodiment 3

The apparatus according to embodiment 1 or embodiment 2, the at least one memory and the computer program code configured to, with the at least one processor, cause the apparatus to at least further perform:
  generating an altitude map based, at least in part, on the spatial grid.

Embodiment 4

The apparatus according to any of the embodiments 1 to 3, wherein the aggregating further comprises:
  allocating the plurality of pieces of estimation information to the grid points according to the respective position information.

Embodiment 5

The apparatus according to any of the embodiments 1 to 4, the at least one memory and the computer program code configured to, with the at least one processor, cause the apparatus to at least further perform:
  interpolating grid points of the spatial grid at which no estimation information has been aggregated, to obtain an interpolated spatial grid.

Embodiment 6

The apparatus according to embodiment 5, wherein the obtaining of a plurality of pieces of estimation information and the aggregating of a plurality of pieces of estimation information form an iteration step, the at least one memory and the computer program code configured to, with the at least one processor, cause the apparatus to use, for a second such iteration step following a first such iteration step, the interpolated spatial grid obtained by interpolating grid points of the spatial grid of the first iteration step as the spatial grid when aggregating the plurality of pieces of estimation information.

Embodiment 7

The apparatus according to any of the embodiments 1 to 6, wherein the grid points of the spatial grid are interpolated by a Kriging-interpolation.

Embodiment 8

The apparatus according to any of the embodiments 1 to 7, wherein the altitude map represents a map region.

Embodiment 9

The apparatus according to any of the embodiments 1 to 8, wherein the altitude map represents a map region limited to a vicinity of a building.

Embodiment 10

The apparatus according to any of the embodiments 1 to 9, the at least one memory and the computer program code configured to, with the at least one processor, cause the apparatus to at least further perform:
  determining a plurality of pieces of combined uncertainty information based, at least in part, on the plurality of pieces estimation information, wherein each of the combined uncertainty information represents a standard deviation with respect to a respective position information; and
  aggregating the plurality of pieces of combined uncertainty information in an uncertainty grid, wherein the uncertainty grid is divided into a plurality of grid points.

Embodiment 11

The apparatus according to embodiment 10, the at least one memory and the computer program code configured to, with the at least one processor, cause the apparatus to at least further perform:
  interpolating grid points of the uncertainty grid at which no combined uncertainty information has been aggregated.

Embodiment 12

The apparatus according to embodiment 10 or embodiment 11, wherein the spatial grid and the uncertainty grid have spatially co-located grid points.

Embodiment 13

The apparatus according to any of the embodiments 10 to 13, wherein the generating of the altitude map is further based on the uncertainty grid.

Embodiment 14

A method, comprising:
  obtaining a plurality of pieces of estimation information, the obtaining comprising receiving or determining the plurality of pieces of estimation information, wherein each of the plurality of pieces of estimation information represents one or more respective absolute values of an altitude, wherein each of the one or more absolute values of an altitude is associated with a respective position information, each of the plurality of pieces of estimation information determined based, at least in part, on a respective relative altitude information and, at least in part, on a respective absolute altitude information associated with a respective data element of a database comprising map data representing an altitude map; and aggregating the plurality of pieces of estimation information in a spatial grid, wherein the spatial grid is divided into a plurality of grid points.

Embodiment 15

The method according to embodiment 14,
the method comprising, in case map data representing an altitude map is not available, and before the obtaining of the plurality of pieces of estimation information and the aggregating of the plurality of pieces of estimation information in the spatial grid, the following steps:

obtaining a plurality of pieces of estimation information, the obtaining comprising receiving or determining the plurality of pieces of estimation information, wherein each of the plurality of pieces of estimation information represents one or more respective absolute values of an altitude, wherein each of the one or more absolute values of an altitude is associated with a respective position information, each of the plurality of pieces of estimation information determined based, at least in part, on a respective relative altitude information and, at least in part, on a respective absolute altitude information associated with a respective data element of a database comprising map data; and aggregating the plurality of pieces of estimation information in a spatial grid, wherein the spatial grid is divided into a plurality of grid points.

Embodiment 16

The method according to embodiment 14 or embodiment 15, the method further comprising:
generating an altitude map based, at least in part, on the spatial grid.

Embodiment 17

The method according to any of the embodiments 14 to 16, wherein the aggregating further comprises:
allocating the plurality of pieces of estimation information to the grid points according to the respective position information.

Embodiment 18

The method according to any of the embodiments 14 to 17, the method further comprising:
interpolating grid points of the spatial grid at which no estimation information has been aggregated, to obtain an interpolated spatial grid.

Embodiment 19

The method according to embodiment 18, wherein the obtaining of a plurality of pieces of estimation information and the aggregating of a plurality of pieces of estimation information form an iteration step, and wherein for a second such iteration step following a first such iteration step, the interpolated spatial grid obtained by interpolating grid points of the spatial grid of the first iteration step is used as the spatial grid when aggregating the plurality of pieces of estimation information.

Embodiment 20

The method according to any of the embodiments 14 to 19, wherein the grid points of the spatial grid are interpolated by a Kriging-interpolation.

Embodiment 21

The method according to any of the embodiments 14 to 20, wherein the altitude map represents a map region.

Embodiment 22

The method according to any of the embodiments 14 to 21, the method further comprising:
determining a plurality of pieces of combined uncertainty information based, at least in part, on the plurality of pieces estimation information, wherein each of the combined uncertainty information represents a standard deviation with respect to a respective position information; and aggregating the plurality of pieces of combined uncertainty information in an uncertainty grid, wherein the uncertainty grid is divided into a plurality of grid points.

Embodiment 23

The method according to embodiment 22, the method further comprising:
interpolating grid points of the uncertainty grid at which no combined uncertainty information has been aggregated.

Embodiment 24

The method according to embodiment 22 or embodiment 23, wherein the spatial grid and the uncertainty grid are have spatially co-located grid points.

Embodiment 25

The method according to any of the embodiments 22 to 24, wherein the generating of the altitude map is further based on the uncertainty grid.

Embodiment 26

An apparatus configured to perform and/or control or comprising respective means for performing and/or controlling the method of any of the embodiments 14 to 25.

Embodiment 27

An apparatus comprising at least one processor and at least one memory including computer program code, the at least one memory and the computer program code configured to, with the at least one processor, cause an apparatus at least to perform and/or control the method of any of the embodiments 14 to 25.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the disclosure on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature of the disclosure and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

The invention claimed is:

1. An apparatus comprising at least one processor and at least one memory including computer program code; the at least one memory and the computer program code configured to, with the at least one processor, cause the apparatus to at least perform:
   receiving relative altitude values detected by one or more sensors;
   obtaining a plurality of pieces of estimation information, the obtaining comprising receiving or determining the plurality of pieces of estimation information, wherein each of the plurality of pieces of estimation information represents one or more respective absolute values of an altitude based on the relative altitude values, wherein each of the one or more absolute values of an altitude is associated with a respective position information, each of the plurality of pieces of estimation information determined based, at least in part, on a respective relative altitude information and, at least in part, on a respective absolute altitude information associated with a respective data element of a database comprising map data representing an altitude map;
   aggregating the plurality of pieces of estimation information in a spatial grid, wherein the spatial grid is divided into a plurality of grid points;
   determining a plurality of pieces of combined uncertainty information based, at least in part, on the plurality of pieces estimation information, wherein each of the combined uncertainty information represents a standard deviation with respect to a respective position information; and
   aggregating the plurality of pieces of combined uncertainty information in an uncertainty grid, wherein the uncertainty grid is divided into a plurality of grid points.

2. The apparatus according to claim 1, the at least one memory and the computer program code configured to, with the at least one processor, cause the apparatus to at least further perform, in case that map data representing an altitude map is not available, and before the obtaining of the plurality of pieces of estimation information and the aggregating of the plurality of pieces of estimation information in the spatial grid, the following:
   obtaining a plurality of pieces of estimation information, the obtaining comprising receiving or determining the plurality of pieces of estimation information, wherein each of the plurality of pieces of estimation information represents one or more respective absolute values of an altitude, wherein each of the one or more absolute values of an altitude is associated with a respective position information, each of the plurality of pieces of estimation information determined based, at least in part, on a respective relative altitude information and, at least in part, on a respective absolute altitude information associated with a respective data element of a database comprising map data; and
   aggregating the plurality of pieces of estimation information in the spatial grid, wherein the spatial grid is divided into a plurality of grid points.

3. The apparatus according to claim 1, the at least one memory and the computer program code configured to, with the at least one processor, cause the apparatus to at least further perform:
   generating an altitude map based, at least in part, on the spatial grid.

4. The apparatus according to claim 1, wherein the aggregating further comprises:

allocating the plurality of pieces of estimation information to the grid points according to the respective position information.

5. The apparatus according to claim 1, the at least one memory and the computer program code configured to, with the at least one processor, cause the apparatus to at least further perform:
interpolating grid points of the spatial grid at which no estimation information has been aggregated, to obtain an interpolated spatial grid.

6. The apparatus according to claim 5, wherein the obtaining of a plurality of pieces of estimation information and the aggregating of a plurality of pieces of estimation information form an iteration step, the at least one memory and the computer program code configured to, with the at least one processor, cause the apparatus to use, for a second such iteration step following a first such iteration step, the interpolated spatial grid obtained by interpolating grid points of the spatial grid of the first iteration step as the spatial grid when aggregating the plurality of pieces of estimation information.

7. The apparatus according to claim 1, wherein the grid points of the spatial grid are interpolated by a Kriging-interpolation.

8. The apparatus according to claim 1, wherein the altitude map represents a map region limited to a vicinity of a building.

9. The apparatus according to claim 1, the at least one memory and the computer program code configured to, with the at least one processor, cause the apparatus to at least further perform:
interpolating grid points of the uncertainty grid at which no combined uncertainty information has been aggregated.

10. The apparatus according to claim 1, wherein the spatial grid and the uncertainty grid have spatially co-located grid points.

11. The apparatus according to claim 1, wherein the generating of the altitude map is further based on the uncertainty grid.

12. A method, comprising:
receiving relative altitude values detected by one or more sensors;
obtaining a plurality of pieces of estimation information, the obtaining comprising receiving or determining the plurality of pieces of estimation information, wherein each of the plurality of pieces of estimation information represents one or more respective absolute values of an altitude based on the relative altitude values, wherein each of the one or more absolute values of an altitude is associated with a respective position information, each of the plurality of pieces of estimation information determined based, at least in part, on a respective relative altitude information and, at least in part, on a respective absolute altitude information associated with a respective data element of a database comprising map data representing an altitude map;
aggregating the plurality of pieces of estimation information in a spatial grid, wherein the spatial grid is divided into a plurality of grid points; and
interpolating grid points of the spatial grid at which no estimation information has been aggregated, to obtain an interpolated spatial grid;
wherein the obtaining of a plurality of pieces of estimation information and the aggregating of a plurality of pieces of estimation information form an iteration step, and wherein for a second such iteration step following a first such iteration step, the interpolated spatial grid obtained by interpolating grid points of the spatial grid of the first iteration step is used as the spatial grid when aggregating the plurality of pieces of estimation information.

13. The method according to claim 12, the method comprising, in case map data representing an altitude map is not available, and before the obtaining of the plurality of pieces of estimation information and the aggregating of the plurality of pieces of estimation information in the spatial grid, the following steps:
obtaining a plurality of pieces of estimation information, the obtaining comprising receiving or determining the plurality of pieces of estimation information, wherein each of the plurality of pieces of estimation information represents one or more respective absolute values of an altitude, wherein each of the one or more absolute values of an altitude is associated with a respective position information, each of the plurality of pieces of estimation information determined based, at least in part, on a respective relative altitude information and, at least in part, on a respective absolute altitude information associated with a respective data element of a database comprising map data; and
aggregating the plurality of pieces of estimation information in the spatial grid, wherein the spatial grid is divided into a plurality of grid points.

14. The method according to claim 12, the method further comprising:
generating an altitude map based, at least in part, on the spatial grid.

15. The method according to claim 12, wherein the aggregating further comprises:
allocating the plurality of pieces of estimation information to the grid points according to the respective position.

16. The method according to claim 12, wherein the grid points of the spatial grid are interpolated by a Kriging-interpolation.

17. The non-transitory computer-readable medium of claim 16, wherein the uncertainty grid and the spatial grid have co-located grid points.

18. The non-transitory computer-readable medium of claim 16, the computer program code when executed by a processor causing an apparatus to perform and/or control:
aggregating the plurality of pieces of combined uncertainty information in the uncertainty grid.

19. A non-transitory computer-readable medium storing computer program code, the computer program code when executed by a processor causing an apparatus to perform and/or control:
receiving relative altitude values detected by one or more sensors;
obtaining a plurality of pieces of estimation information, the obtaining comprising receiving or determining the plurality of pieces of estimation information, wherein each of the plurality of pieces of estimation information represents one or more respective absolute values of an altitude based on the relative altitude values, wherein each of the one or more absolute values of an altitude is associated with a respective position information, each of the plurality of pieces of estimation information determined based, at least in part, on a respective relative altitude information and, at least in part, on a respective absolute altitude information associated with a respective data element of a database comprising map data representing an altitude map;

aggregating the plurality of pieces of estimation information in a spatial grid, wherein the spatial grid is divided into a plurality of grid points; and determining a plurality of pieces of combined uncertainty information based, at least in part, on the plurality of pieces estimation information, wherein the combined uncertainty information is associated in an uncertainty grid.

* * * * *